June 19, 1934.　　　　I. E. McCABE　　　　1,963,140
CONTROL FOR STOKER MECHANISMS FOR FURNACES
Filed July 31, 1933　　　5 Sheets-Sheet 2

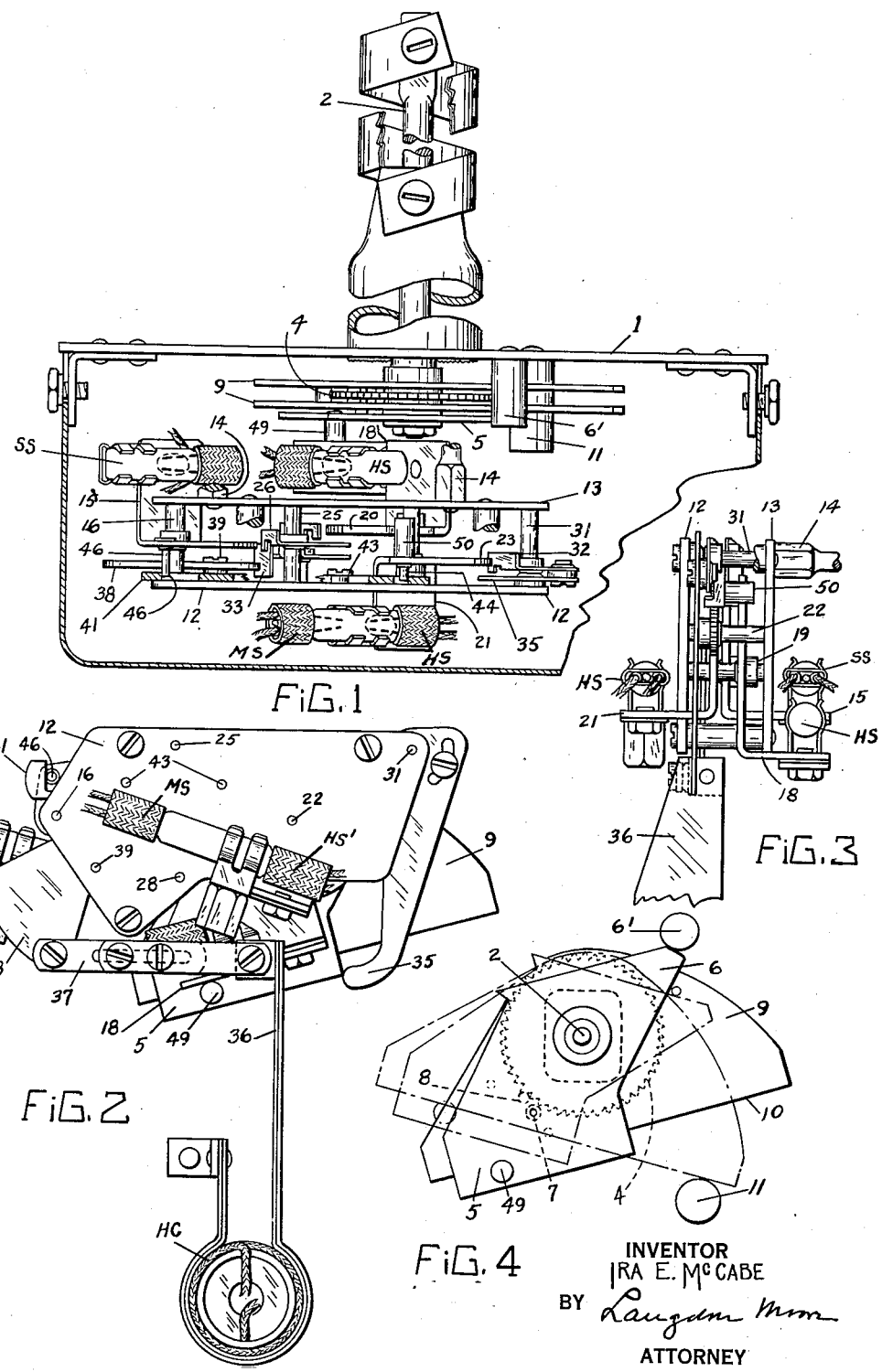

INVENTOR
IRA E. McCABE
BY
ATTORNEY

June 19, 1934.  I. E. McCABE  1,963,140
CONTROL FOR STOKER MECHANISMS FOR FURNACES
Filed July 31, 1933  5 Sheets-Sheet 3

INVENTOR
IRA E. McCABE
BY  Laugum mm
ATTORNEY

June 19, 1934.  I. E. McCABE  1,963,140
CONTROL FOR STOKER MECHANISMS FOR FURNACES
Filed July 31, 1933  5 Sheets-Sheet 4

INVENTOR
IRA E. McCABE
BY
ATTORNEY

June 19, 1934.  I. E. McCABE  1,963,140
CONTROL FOR STOKER MECHANISMS FOR FURNACES
Filed July 31, 1933     5 Sheets-Sheet 5

INVENTOR
IRA E. McCABE
BY Langdon Moore
ATTORNEY

Patented June 19, 1934

1,963,140

UNITED STATES PATENT OFFICE 1,963,140

CONTROL FOR STOKER MECHANISMS FOR FURNACES

Ira E. McCabe, Chicago, Ill.

Application July 31, 1933, Serial No. 683,036

11 Claims. (Cl. 236—1)

This invention relates to improvements in controls for electrically operated stoker mechanisms for feeding coal to furnaces and more particularly to providing means in connection with the control mechanism for maintaining the continuous burning of coal where automatically controlled heat is desired, as in the heating of dwellings or buildings.

It is an object of this invention to provide in a device of this kind a temperature operated mechanism acting upon a drop in temperature as caused by a diminishing of fuel in the combustion chamber of the furnace to set in motion additional means which operates a predetermined time after the fall in temperature, to close an electric circuit to the electrically operated mechanism to feed coal to the combustion chamber of the furnace and maintain it closed until the desired temperature is reached and then discontinue the feeding of coal until another drop in temperature occurs.

It is another object of this invention to allow the return of the additional mechanism to its starting position after each initiation of operation by the temperature actuated means before a second initiation of operation can be effected. This provides a time interval, after the desired period of operation of the controlled mechanism has been obtained, which prevents unnecessary and too frequent operation of the additional means, upon fluctuation in temperature or rapid dissipation of heat, effecting a rapid operation of the temperature operated mechanism shortly after the opening of the controlled circuit.

It is a further object to provide a normally closed safety switch which is released to open as the additional mechanism returns to its starting position and means to prevent its opening at those times the additional mechanism is functioning to close the controlled circuit or at such times as that circuit is closed and the temperature operated mechanism placed in the position assumed upon an increase in temperature. The opening of the safety switch opens the controlled circuit and renders the device or other controls incapable of closing said circuit until manually reset.

It is contemplated to use the intermittent circuit closing and safety mechanism in combination with a relay which relay, when energized, closes the circuit to the controlled mechanism, such as the motor of a stoker.

The relay employed is of the type disclosed in this applicant's co-pending application, Serial No. 500,747, filed December 8, 1930, which permits the use of a low voltage control circuit which, when embodied in this device, would be opened and closed by the intermittent circuit closing mechanism as well as independently of said mechanism by a remote control, such as a room thermostat, which permits extended periods of motor operation as called for by the dwelling in which the equipment is installed. The relay may also be of the type disclosed in the applicant's co-pending application, Serial No. 508,185, filed January 12, 1931, which may be advantageously employed in both alternating and direct current circuits.

It is further contemplated to employ in the low voltage circuit of the relay an electrical resistance element located within that area which effects the operation of the temperature actuated mechanism. This element is preferably formed of spaced apart windings of nickel wire so that, at normal temperatures, such current as required for the operation of the relay may pass therethrough, but upon excessive temperature being reached, which might prove destructive to the control parts or produce a fire hazard by overheating the temperature of the element increases to increase its resistance and reduce the passage of current therethrough sufficiently to deenergize the relay to open the motor circuit and maintain it open as long as the excessive temperature exists. As an alternative a temperature operated device of a commercial type such as illustrated in Patent No. 1,834,288, December 1, 1931, may be employed in place of the resistance element though such a device would increase the cost of the control system.

With these and other objects in view reference is made to the accompanying sheets of drawings which illustrate preferred embodiments of this invention with the understanding that minor detail changes may be made without departing from the scope thereof.

In the drawings:—

Figure 1 is a fragmentary top plan view of this improved control apparatus mounted on the panel of a stack mechanism of commercial form with the cover therefor shown in horizontal section.

Figure 2 is a detail view in front elevation of the switch carriers and electro-thermal actuating element therefor, removed from the panel.

Figure 3 is a fragmentary view in end elevation of Figure 2.

Figure 4 is a detail view in front elevation of the stack mechanism actuating parts, with the switch carriers removed.

Figure 13:
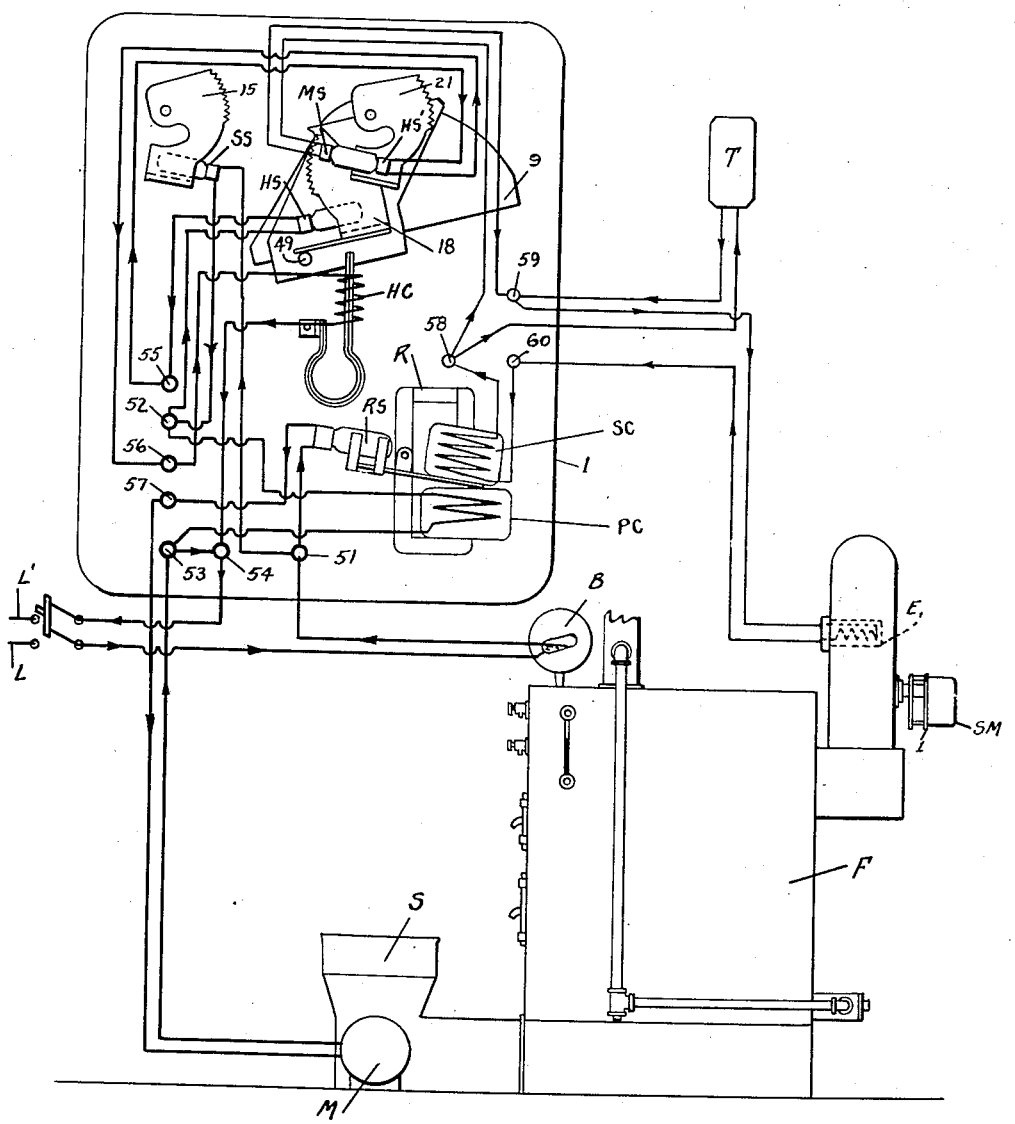
Figure 13 is a schematic wiring diagram illustrating the application of this control to a stoker mechanism for a coal burning furnace or boiler, including the application of a relay and including in the low voltage circuit thereof a limiting resistance, as hereinbefore described.

The embodiment of this invention as illustrated upon the drawings includes a bi-metallic temperature operated stack mechanism, preferably of the type disclosed in the applicant's prior Patent No. 1,762,183 of June 10, 1930, a motor switch, a heater switch, a safety switch, and an electro-thermal element cooperating with the stack mechanism to operate the switches. The diagram on Figure 13 illustrates the stack mechanism SM mounted on the stack from a furnace or boiler F to which the stoker mechanism S, operated by an electric motor M, is applied. The motor circuit is completed through the improved control mechanism preferably mounted upon the panel 1 forming a part of the stack mechanism. In Figure 13, the stack mechanism is indicated in full lines as it would appear in an installation. This figure being a schematic diagram the panel with the operating parts of the control mechanism is shown detached for the purpose of illustrating a wiring diagram. The operating circuit of the stoker motor is connected through the control mechanism to the commercial line L—L' and includes the usual boiler control B, of commercial form, responsive to excessive pressure or excessive temperature within the heater or boiler. The operation of the device is controlled by room thermostat T, of commercial form, located in that part of the dwelling or building where it is desired to maintain an even predetermined temperature.

Referring to Figure 1, the panel 1 mounts a bi-metallic helical member which normally enters within the stack of the furnace or heater and is responsive to temperature changes therein. The free end of the bi-metallic member engages the end of a shaft 2 which extends through and is rotatably mounted on the panel 1. The inner portion of the shaft 2 mounts a toothed disc wheel 4 which is keyed to the shaft and the end of the shaft also rotatably mounts a plate 5 which may be held against longitudinal movement in any desired manner, so that the flat surfaces of the disc 4 and the plate remain parallel. The plate 5 is of such dimensions that one of its upper corners 6 engages the stud 6' mounted upon the panel 1 to limit its rotation about the shaft in one direction. Below the center of the shaft 2 and at one side of the disc wheel 4 the plate 5 engages by a pivot pin 7 two similarly spaced apart plates 9 each having an enlarged opening of greater size than the shaft 2 which passes therethrough and which allows movement of said plates 9 about the pivot 7. A roller 8 adapted to engage and travel over the circumference of the toothed disc wheel 4 is mounted between the plates 9 and is maintained in contact therewith by the weight of the plates 9.

The plate 5, as shown, is formed with the upper right hand portion 6 above the shaft 2 extended to engage the stud 6' to limit rotation in that direction with the body of the plate extended below and to the left of the shaft 2, so that when free to rotate about the shaft 2, the plate will normally swing about the shaft 2 until the portion 6 engages said stud.

The plates 9 are somewhat triangular shaped with the longest sides or bases 10 arranged at the bottom and the shaft openings arranged substantially above the center thereof, so that the plates are capable of a certain amount of free movement about the pivot 7.

The disc wheel 4 is provided with a series of peripheral teeth so that the weight of that portion of the plates 9 on the other side of the shaft 2 will normally hold the roller 8 in contact with the body of the disc wheel between the apices of two adjacent teeth, and upon rotation of the shaft 2 in one direction, the disc wheel 4 will rotate therewith and the roller 8 carried upon the plates 9 will through the contacting relation to the toothed surface of the disc and connection of the pivot 7 to the plate 5 impart a rotative movement to said plate in the same direction until the corner 6 of the plate 5 engages the stud 6' and when this occurs the plate 5 will remain stationary and continued rotation of the shaft in the same direction forces the roller outward against the weight of the plates 9 causing it to continue to ride over the teeth. When rotation of the shaft ceases, the roller contact will maintain the plate stationary, but immediately upon reverse rotation of the shaft the roller connection will impart a reverse rotation to the plate 5 until the under side 10 of the plates 9 engage a stop 11 mounted upon the panel 1 and continued reverse rotation of the shaft 2 will maintain the plate 5 stationary as long as the toothed surface of the disc continues to pass below the roller 8.

Figure 6:
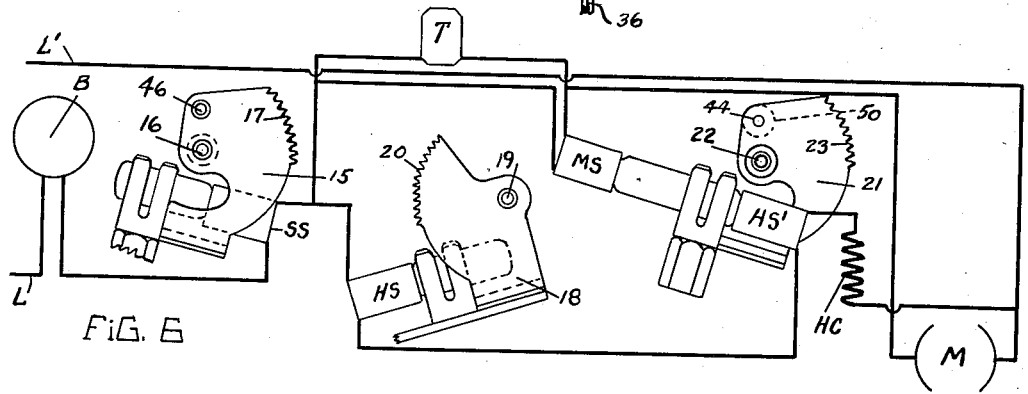
Figure 6 is a schematic wiring diagram showing the switches in the position illustrated in Figure 5.
Figure 8:
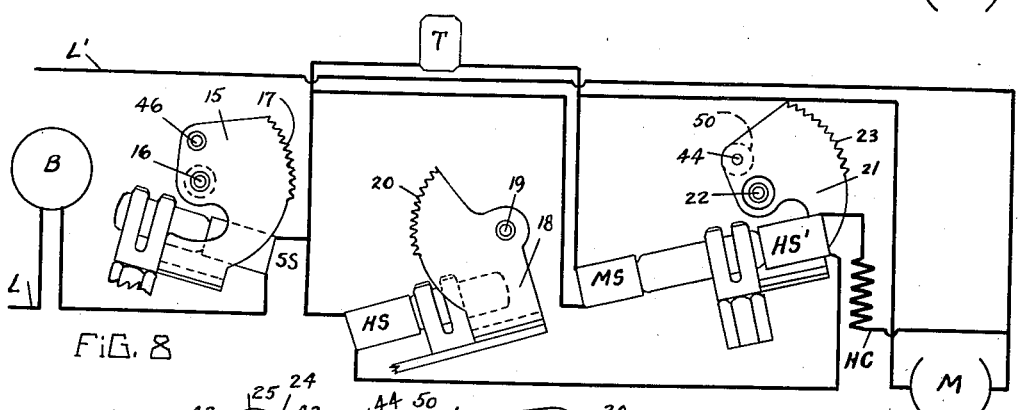
Figure 8 is a schematic wiring diagram showing the switches in the position illustrated in Figure 7.

As shown in Figures 1 and 2 and the schematic diagrams in Figures 6 and 8, the switches employed in this control are of the mercury tube type and are operated by tilting or swinging the switch so that the mercury contained therein flows from one end to the other to make or break the circuit therethrough. The switch operating mechanism for this control is mounted between two spaced apart plates 12 and 13, as shown in Figure 1, which in turn are spaced apart from the panel 1 by braces 14. Each of the switches is mounted upon an individual pivoted carrier plate having an arcuate toothed section.

The safety switch SS is mounted upon the carrier plate 15 rotatively mounted upon the pivot 16 which pivot extends between plates 12 and 13 and is provided with an arcuate serrated portion 17. The carrier plate 15 extends below the rear supporting plate 13 and is provided with an angular extension, so that the safety switch will oscillate between the plate 13 and the panel 1. The heater switch HS is mounted upon a carrier plate 18 rotatively mounted upon a pivot 19 extending between the plates 12 and 13 and is provided with an arcuate serrated portion 20 with the teeth thereof extending in the direction of the safety switch SS. The carrier plate 18 extends below the rear supporting plate 13 and is provided with an angular extension, so that the heater switch will oscillate between the plate 13 and the panel 1. The motor switch MS is supported upon a carrier plate 21 rotatively mounted upon the pivot 22 extending between the plates 12 and 13 and is provided with an arcuate serrated portion 23 similar to that upon the safety switch plate 15. The carrier plate 21 extends below the front plate 12 and is provided with an angular extension, so that the motor switch will oscillate on the outer side of the plate 12. As shown in Figures 1, 2, 6 and 8, the motor switch is of the two circuit type of mercury tube switch, whereby a circuit is closed through each end thereof when the switch is tilted to cause the body of mercury to close the circuit through the lower end and break the circuit through the other.

Figure 5:
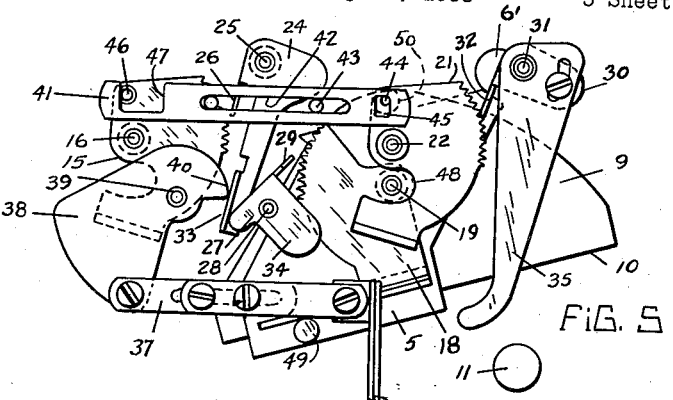
Figure 5 is a view similar to Figure 2 with the front cover plate removed and the electro-thermal element broken away, showing the position the parts assume after the opening of the thermostat and cooling of the temperature operated mechanism.

Each carrier plate is provided with a pivoted latch, best shown in Figure 5. The safety switch latch 24 is rotatively mounted upon the pivot 25 extending between the plates 12 and 13 having a depending pawl 26 adapted when the plate is rotated in one direction to engage the serrated portions 17 and lock the carrier plate 15 against counter rotation. The carrier plate 18 is provided with the heater switch latch 27 rotatively mounted upon the pivot 28 extending between the plates 12 and 13 and is provided with a projecting pawl 29 adapted upon rotation of the plate in one direction to engage the serrated portion 20 of the carrier plate and hold it against counter rotation. The motor switch carrier plate is provided with a pivoted latch 30 rotatively mounted upon the pivot 31 extending between the plates 12 and 13 and is provided with a projecting pawl 32 adapted when the plate is rotated in one direction to engage the serrated portion 23 of the motor switch carrier plate 21 and hold it against counter rotation. As shown in Figure 5, the safety switch carrier latch 24 is provided with a depending portion 33 so proportioned that its weight, if unrestricted, will normally hold the pawl in engagement with the serrated portion of the switch carrier. The heater switch latch 27 is provided with a projecting portion 34 so proportioned that the weight of which, if unrestricted, will normally engage the serrated portion of the heater switch carrier. The motor switch latch 30 is provided with a depending portion 35 so proportioned that the weight of which, if unrestricted, will normally contact the serrated portion 23 of the motor switch carrier to allow rotation thereof in the direction to open the motor switch, but engage and hold the carrier against rotation in the direction to close the motor switch.

Mounted upon the panel 1 below the above described switch mechanism is arranged an electro-thermal element including a strip of bi-metallic metal surrounding the coil HC of electrical resistance wire and having an upwardly extending arm 36, as shown in Figure 2, the free end of which upon an increase in temperature in the heating coil HC moves to the right. The free end of the arm 36 is pivotally connected to a link 37, the other end of which is pivotally connected to a latch release 38 rotatively mounted upon a pivot 39 extending from the inner side of the front plate 12, as shown, in Figure 1, and provided with a cam nose 40, so proportioned when the arm 36 assumes the position shown in Figures 2 and 5, the nose 40 will engage the depending portion 33 of the safety switch carrier latch 24 to hold it out of engagement with the safety 24 switch carrier and allow the depending portion 33 to engage the heater switch 34 to carry it out of contact with the heater switch carrier plate.

When the heat coil HC is energized it causes the bi-metallic arm 36 to move to the right and upon continued movement will engage the tail of the depending portion 35 of the motor latch 30 and cause it to rotate about its pivot 31 out of engagement with the motor switch carrier 21 and allow the motor switch MS thereon to close. A connecting bar 41 having a longitudinal slot 42 is mounted to slide in a horizontal direction over the pair of rollers 43 carried upon the outer plate 12 which are received within the slot 42. The motor switch carrier 21 above its pivot 22 is provided with a stud 44 which is received within a vertical slot 45 at the right end of the bar 41. The safety switch carrier 15 is provided above its pivotal point with a stud 46 which is received within a horizontally cutout portion 47 upon the other end of the bar 41. The relation of the slot 45 and cutout portion 47 in the bar 41 is such that when the motor switch carrier is in the position shown in Figure 5, the safety switch carrier supports the safety switch in closed position and the pin 46 engages the left hand end of the recess 47, thereby preventing rotation of the safety switch carrier, when freed from its latch 24, to open the safety switch. The motor switch carrier plate 21 is provided with a cutout portion 48 which surrounds the pivot 19 of the heater switch carrier 18 and allows for the movement of the motor switch carrier when actuated.

Figure 7:
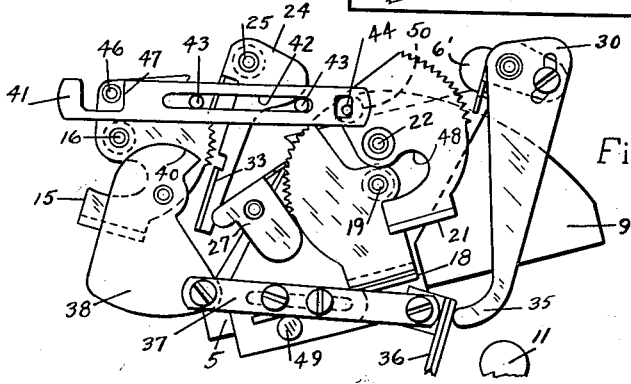
Figure 7 is a view similar to Figure 5 showing the position assumed by the parts with the motor switch closed after the closing of the heater switch.
Figure 9:
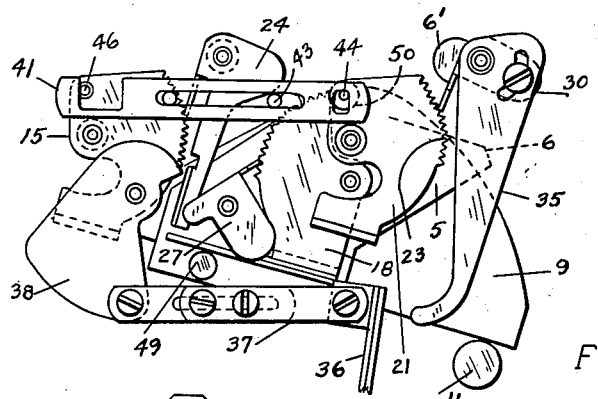
Figure 9 is a view similar to Figure 5 showing the position assumed by the parts after the closing of the motor switch and the stack safety mechanism has lifted the heat switch carrier to actuate the motor switch carrier.
Figure 10:
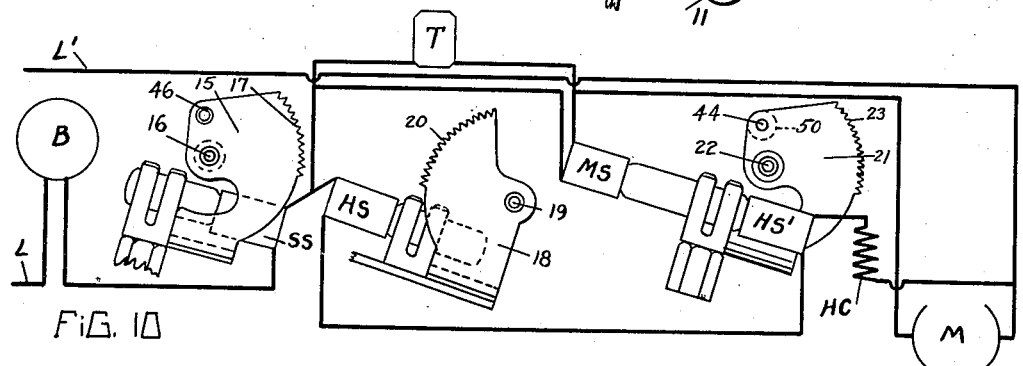
Figure 10 is a schematic wiring diagram showing the switches in the position illustrated in Figure 9.
Figure 12:
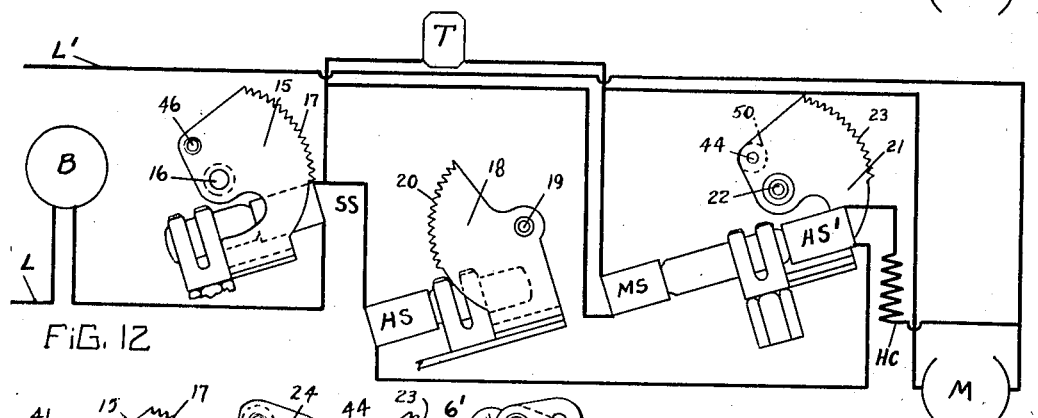
Figure 12 is a schematic wiring diagram showing the switches in the position illustrated in Figure 11.

As seen in full lines in Figures 1 and 3, and indicated in dotted lines in Figures 5, 6 and 7, a stud 50 projects from the surface of the motor switch carrier 23 to extend over and in line with the upper edge of the heater switch carrier 18 and be spaced apart therefrom when the heater switch carrier is in the closed position, as shown in Figure 5, but be engaged thereby to rotate the motor switch carrier when the stack mechanism responsive to an increase in stack temperature tilts the heater switch carrier about its axis and tilts the motor switch MS to open position, as shown in Figure 9.

The plate 5 of the stack mechanism is provided with a stud 49 extending from the lower portion thereof under the heater switch carrier 18, as shown in Figures 2, 5 and 9. When the thermostatic element responds to an increase in stack temperature, the plate 5 is caused to rotate in a clockwise direction and the stud 49 engaging the under side of the heater switch carrier 18 will cause the carrier to be rotated about its pivot to open the heater switch HS and when the thermostatic element of the stack mechanism cools the heater switch, if freed from its pawl 27, will be permitted to rotate to its closed position.

In electrically operated stoker mechanisms for feeding coal to furnaces it is necessary to intermittently feed enough coal to the furnace to maintain a low fire at such times when the room thermostat is open and when the room thermostat is closed by a drop in temperature below the desired degree in the room in which it is located, provision is made to continually feed coal to the furnace and create what may be termed a high fire until the desired temperature in the room is again reached.

In Figure 5 of the drawings the parts are illustrated in the respective positions assumed after the opening of the thermostat and the cooling of the stack from the furnace preparatory to begin the automatic intermittent operation or be actuated by the room thermostat. The motor switch carrier 21 is locked in the open position with the secondary heater switch HS', forming a part of the motor switch, held in the closed position, the heater switch carrier 18 rests upon the pin 49 of the stack safety mechanism with the heater switch HS in the closed position, and the safety switch carrier 15 is prevented from swinging the safety switch SS into open position by the pin 46 on the switch carrier engaging the end of the cutout portion 47 of the bar 41 engaging at the other end the stud 44 upon the motor switch carrier 21.

Referring to the wiring diagram in Figure 6, it is seen that one lead L from the commercial line passes through the boiler control B to the closed safety switch SS and a circuit therefrom is established through the heater switch HS and through the secondary heater switch HS' and thence through the heating coil HC to the return line L' of the commercial circuit. The room thermostat being open, the automatic intermittent operation will start as the circuit from the safety switch SS to the stoker mechanism M is broken through the thermostat and likewise the motor switch MS being open, the circuit from the safety switch SS through the motor switch MS to the motor M is broken through the motor switch, but as the circuit is established through the heating coil HC, as above described, the bi-metallic arm 36 will gradually move to the right and in so doing through the link 37 rotate the latch release in counterclockwise direction allowing the latch 24 to lock the safety switch in closed position and free the heater switch latch 27 to engage the serrated portion 20 of the heater switch carrier and the end of the arm 36 will then engage the motor switch latch 30 to release the motor switch carrier 21, so that the motor switch MS is freed and by its own weight will swing to closed position, as shown in Figure 7, and, at the same time will open the secondary switch HS' to break the circuit through the heating coil HC. The closing of the motor switch establishes the circuit from the safety switch SS through the motor switch MS to the stoker motor M, whereupon fuel will be delivered to the furnace. As soon as the motor switch MS closes, the secondary heater switch HS' opens, so that while the stoker motor M is operating the heat coil HC is deenergized and the arm 36 cools and returns to the vertical position. The delivery of fuel will continue until sufficient heat is produced to cause the thermostatic element of the stack mechanism to rotate the plate 5 which through stud 49 rotates the heater switch carrier 18 to open the heater switch HS and at the same time bringing the upper end thereof in contact with the stud 50 extending in line therewith from the motor switch carrier 21 so that continued rotation of the heater switch carrier 18 will, by contact with stud 50 on the motor switch carrier 21, tilt the motor switch carrier 21 about its pivot to open the motor switch MS and close the secondary heater HS', as shown in Figure 9, whereupon the stoker motor ceases to operate and the stack temperature drops to actuate the stack switch mechanism to close the heater switch HS, causing the device to recycle.

As shown in Figure 9, should the stack mechanism operate to open the motor switch MS through the rotation of the heater switch carrier and pin 50 while the bi-metallic arm 36 is returning during the cooling stage, the motor latch 30 will hold the motor switch MS in open position and the heater latch 27 will hold the heater switch HS open until the arm 36 completes its return movement to the vertical position, whereupon the nose 40 of the latch release 38 actuates the latch 27 to free the heater switch carrier 18 to close the heater switch HS. Should the stack temperature decrease to cause the plate 5 to rotate in the opposite direction before the bi-metallic arm 36 completes its cooling cycle, the heater switch HS will remain latched in the open position, as shown in Figure 9, and, in such event, the heater switch HS cannot close to start a re-cycle of the mechanism until the bi-metallic arm 36 completes its cooling cycle and the link 37 and associated parts unlatch the heater switch. If the bi-metallic arm 36 has completed its cooling cycle when the stack switch mechanism operates on the temperature decrease, the heater latch 27 will have been withdrawn from serrations 20 on the carrier 18 and as the plate 5 is rotated the heater switch carrier 18 will follow the pin 49 to reach the closed position of the heater switch and re-cycling will begin.

The motor latch 30 is adjustable, as shown, whereby the period of time consumed by the arm 36 to move from the position shown in Figure 5 to release the motor latch 30, as shown in Figure 7, may be determined and likewise the link 37 is adjustable, whereby the period of time consumed by the arm 36 as it cools to release the heater and safety switch latches 27 and 24 through nose 40 may be determined. This automatic intermittent operation of the stoker will normally continue while the room thermostat remains open to maintain a low fire.

Figure 11:
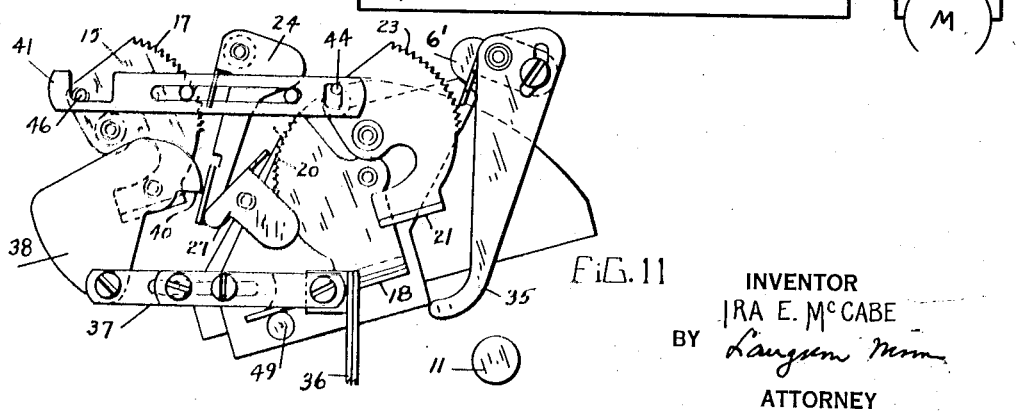
Figure 11 is a view similar to Figure 5 showing the position assumed by the parts after the closing of the motor switch and opening of the heater circuit if the temperature operated mechanism fails to operate.

Should at any time during the automatic intermittent operation of this mechanism the fire in the stoker mechanism become extinguished from any cause, the next time thereafter during the normal cycle of operation, as above described, upon the return of the arm 36 to the vertical position the latch release 38 releases the safety latch 24. The motor switch carrier plate 18 having been released to close the motor switch MS will have, through stud 44, moved the bar 41 to the left away from the stud 46 on the safety switch carrier 15, allowing said carrier to rotate to open the safety switch SS, as shown in Figure 11, whereupon all operation ceases including that so called for by the room thermostat until fire is re-established and the safety switch SS manually returned to closed position.

As seen from the above wiring diagrams, whenever the room thermostat T calls for a high fire by closing, a circuit is established from the safety switch SS through the thermostat T to the stoker motor M independently of the other circuits so that, as long as the room thermostat remains closed and the device operates normally, the stack switch mechanism will remain in the position shown in Figure 9 and the pin 49 having opened the heater switch HS will maintain it open until the room thermostat T opens and the cooling of the stack causes the stack switch mechanism to carry the pin 49 to the position shown in Figure 5. Thereafter the automatic intermittent mechanism will continue the low fire as hereinbefore described.

Figure 13 illustrates a preferred embodiment of this invention including the relay and limiting resistance referred to in the introduction to this specification. The relay R is mounted on the panel 1 below the automatic intermittent mechanism and is of the transformer repulsion type, now a commercial article, as described in this applicant's co-pending application, Serial No. 500,947, filed December 8, 1930, and includes a stationary primary coil PC which is normally connected in the commercial circuit and a movable secondary coil SC connected in series with the limiting resistance E and the room thermostat T, whereby the closing of the secondary circuit energizes the relay to close the relay switch RS to place the stoker motor in the commercial circuit.

The parts for the automatic intermittent operation are the same as previously herein described and operate in the same manner, the only difference being that the switch MS in this embodiment is connected in series in the secondary circuit of the relay to operate the switch RS in the commercial circuit to the stoker motor M.

The commercial current entering line L passes through the boiler control B to the binding post 51 and from there through the safety switch SS to binding post 52. From binding post 52 a circuit is established through the primary coil PC of the relay R and from thence through binding posts 53 and 54 to the return line L'. Another circuit is established from the binding post 52 through the heater switch HS to binding post 55 and from there through the secondary heater switch HS' to binding post 56 and from there through the heat coil HC to binding post 54 and to the return line L'. Upon operating the relay R the switch RS is closed to establish a circuit from binding post 51 through the switch RS to binding post 57 and from there through the stoker motor M and back by the way of binding posts 53 and 54 to the return line L'.

In the form shown in Figure 13, the room thermostat T and the switch MS of the intermittent control mechanism are each connected in series in the secondary circuit with an electric resistance element E, preferably formed of spaced apart windings or wire, such as nickel, which at normal temperature allows such current as required for the operation of the relay R to pass therethrough, but upon an excessive increase in temperature its resistance increases to reduce the passage of current therethrough sufficiently to deenergize the relay. It is preferable to locate the limiting resistance E in the stack adjacent the stack switch mechanism SM, as shown. The introduction of this limiting resistance in the secondary circuit, as described, prevents the stoker mechanism from producing a temperature which would be dangerous by overheating to the extent of producing a fire in the building.

As shown in Figure 13, the secondary current passes from the secondary coil SC to the binding post 58. From binding post 58, when the thermostat T is closed, it passes through the thermostat T to the binding post 59 and from thence through the limiting resistance E to the binding post 60 and returns to the coil SC. When the switch MS is closed the current passes from binding post 58 through switch MS to binding post 59 and from thence through the element E to the binding post 60 and returns to the coil SC. In this embodiment the room thermostat and the switch MS control the operation of the stoker motor M in the same manner as hereinbefore described, but through the actuation of the relay R, allowing the circuit to the motor M to be opened and closed through the relay operated switch RS, whereby the current of the commercial motor circuit does not pass through the safety switch SS. The limiting resistance E when either the thermostat T or the switch MS is closed will open the switch RS in the event the stoker mechanism overheats the furnace or boiler and the safety switch when open breaks the primary coil circuit to deenergize the relay to open the motor circuit.

Figure 14:
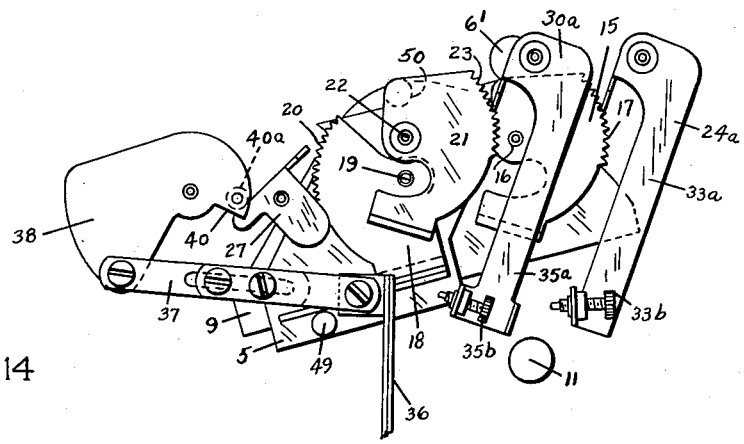
Figure 14 is a view similar to Figure 5 of a modified form of this apparatus.
Figure 15:
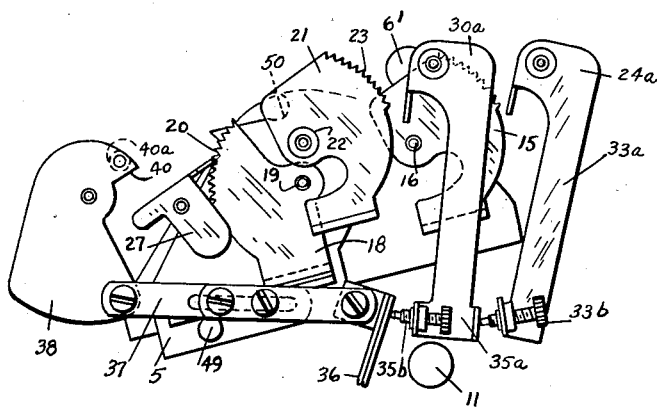
Figure 15 is a view similar to Figure 13 showing the position of the parts assumed after the closing of the motor switch and release of the safety switch.
Figure 16:
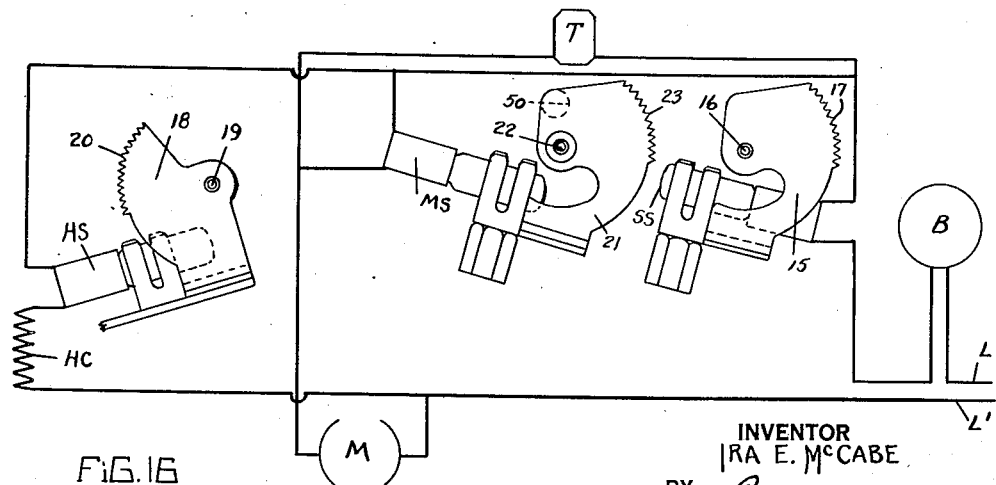
Figure 16 is a schematic wiring diagram showing the switches in the position illustrated in Figure 14.

Figures 14 and 15 illustrate a modified form of this invention with the wiring diagram shown thereof in Figure 16. In this form the safety switch carrier 15 is mounted to the right of the motor switch carrier 21 and the nose 40 of the latch release 38 is provided with an outstanding stud 40a adapted to engage and release the heater latch 27. The motor latch 30a is provided with a depending portion 35a terminating in an adjustable contact member 35b adapted to be engaged by the free end of the arm 36. The safety latch 24a is provided with a depending portion 33a terminating in a similar adjustable contact adapted to be engaged by the lower end of the motor latch 35a.

As shown in the diagram in Figure 16, the line current entering by lead L passes through the boiler control B to the safety switch SS. From the safety switch SS a circuit is established through the room thermostat T to the motor M of the stack mechanism. Another circuit is established from the safety switch SS through the motor switch MS to the stoker motor M and a third circuit is established from the safety switch SS through the heater switch HS and through the heat coil HC to the return line L'. The heater switch HS and motor switch MS are opened and closed by operation of the stack switch mechanism SM in the same manner as hereinbefore described. With the room thermostat T open and the motor switch MS open the circuit is closed through the heat switch HS and heat coil HC. The movement of the arm 36 actuates the latch release 38 and stud 40a releases the heater latch 27 and by contact with the motor latch 30a allows the motor switch to open. In the event thereafter the stack switch mechanism fails to open the heat switch HS the arm 36 will continue moving to the right bringing the end of 35a of the motor latch 30a into contact with the stop 35b on the safety latch 24a and will thereafter release the safety switch carrier to allow the safety switch to open. By the proper adjustment the contacts 35b and 33b, the time of operation of the arm 36 to release the motor latch may be determined and the time required after the release of the motor latch to release the safety latch may also be determined.

This invention is an improvement over automatic stoker control mechanisms which act upon each drop in temperature to immediately set the mechanism to establish and maintain a low fire in operation, in that this invention provides a positive predetermined delay or time interval after each opening of the motor circuit before the motor can again be operated, preventing unnecessary and too frequent operation of the motor upon fluctuations in temperature.

What I claim is:

1. In an electrically operated and controlled stoker mechanism including a stoker motor, a source of electricity, a remote control switch, a motor switch, a stack mechanism responsive to stack temperature, an electro-thermal actuator including a heater element, a heater switch, means actuated by the stack mechanism upon a rise in stack temperature to open the heater switch and through said movement open the motor switch, releasable means to hold the motor switch and heater switch in open positions, means operated by the actuator when cooling to release the heater switch to close, said stack mechanism upon a drop in stack temperature, allowing the heater switch to close, means to establish a circuit from the source through the closed heater switch and heater element to operate the actuator to free the motor switch to close, means to establish a circuit from the source through the closed motor switch and motor to intermittently operate the motor to maintain a low fire, means to establish an independent circuit from the source through the remote control switch and motor to maintain a high fire, whereby the actuator must release the heater switch after each opening of the motor switch before the motor switch can be again closed.

2. The structure of claim 1 wherein a normally closed releasable safety switch is interposed in circuit between the source and each of the above circuits as may be established, and means to maintain the safety switch closed when the motor switch is open, said means acting a predetermined time after the closing of the motor switch, to release the safety switch to open.

3. The structure of claim 1 in which the heater and motor switches are mounted upon pivoted and serrated carrier plates, whereby the weight of the switches normally rotate the carrier plates to open the switches, and the releasable means to hold the switches in open position include pivoted weighted latches adapted to normally engage the serrations of said plates and operated by movement of the actuator to release said carrier plates.

4. The structure of claim 1 wherein a pivoted latch release is provided with a connection on one side of its pivot to the free end of the actuator and with means on the other side to engage and release the heater switch holding means whereas the actuator cools.

5. In an electrically operated and controlled stoker mechanism including a stoker motor, a source of electricity, a remote control switch, a motor switch, a stack mechanism responsive to stack temperature, an electro-thermal actuator including a heater element, a heater switch, a secondary heater switch operating concurrently and oppositely with the motor switch, means actuated by the stack mechanism upon a rise in stack temperature to open the heater switch and through said movement open the motor switch and close the secondary heater switch, releasable means to hold the motor switch and heater switch in open position, means operated by the actuator when cooling to release the heater switch to close, said stack mechanism upon a drop in stack temperature allowing the heater switch to close, means to establish a circuit from the source through the closed heater switch, closed secondary heater switch and heater element to operate the actuator to free the secondary heater switch to open and the motor switch to close, means to establish a circuit from the source through the motor switch and motor to intermittently operate the motor to maintain a low fire, means to establish an independent circuit from the source through the remote control switch and motor to maintain a high fire so that the stack mechanism maintains the heater switch open, and whereby the actuator must release the heater switch after each opening of the motor switch before the motor switch can be again closed.

6. The structure of claim 5 wherein a normally closed releasable safety switch is interposed in circuit between the source and each of the above circuits as may be established, and means to maintain the safety switch closed when the motor switch is open, said means acting a predetermined time after the closing of the motor switch, to release the safety switch to open.

7. The structure of claim 5 wherein the heater switch is mounted on a pivoted carrier plate to normally rotate the switch to closed position and said plate is provided with means to be engaged by the stack mechanism upon a rise in stack temperature to rotate the switch to open position, said motor switch is mounted upon a pivoted carrier plate to normally rotate the motor switch to closed position and said plate also mounting the secondary heat switch normally in open position, and means upon the motor switch carrier plate adapted to be engaged by the heater switch carrier as it opens the heater switch to rotate the motor switch carrier to open the motor switch and close the secondary heat switch.

8. The structure of claim 5 wherein the heater switch is mounted on a pivoted carrier plate to normally rotate the switch to closed position and said plate is provided with means to be engaged by the stack mechanism upon a rise in stack temperature to rotate the switch to open position, said motor switch mounted upon a pivoted carrier plate to normally rotate the motor switch to closed position and said plate also mounting the secondary heat switch normally in open position, means upon the motor switch carrier plate adapted to be engaged by the heater switch carrier as it opens the heater switch to rotate the motor switch carrier to open the motor switch and close the secondary heat switch, a normally closed releasable safety switch interposed between the source and said circuits as may be established, a pivoted safety switch carrier plate mounting said switch to normally open said safety switch, means actuated upon the rotation of the motor carrier plate to open the motor switch to hold the safety switch closed against release as long as the motor switch remains open and free said holding means when the motor switch carrier plate rotates to close the motor switch, and means to release the safety switch to open the circuit upon failure of combustion to actuate the motor switch to open position.

9. In an electrically operated and controlled stoker mechanism including a stoker motor, a source of electricity, a thermostatic switch, a motor switch, a stack mechanism responsive to stack temperature, an electro-thermal actuator including a heater element, a heater switch, a secondary heater switch operating concurrently and oppositely with the motor switch, a repulsion relay, a relay switch actuated thereby, means actuated by the stack mechanism upon a rise in stack temperature to open the heater switch and through said movement open the motor switch and close the secondary heater switch, releasable means to hold the motor switch and heater switch in open position, means operated by the actuator when cooling to release the heater switch to close, said stack mechanism upon a drop in stack temperature allowing the heater switch to close, means to establish a circuit from the source through the primary of the relay, means to establish a circuit from the source through the closed heater switch, closed secondary heater switch and heater element to operate the actuator to free the secondary heater switch to open and the motor switch to close, means to establish a circuit through the closed motor switch and secondary of the relay to close the relay switch, means to establish a circuit from the source through the closed relay switch to intermittently operate the stoker motor to maintain a low fire, means to establish a circuit from the secondary of the relay and closed thermostatic switch to maintain a high fire so that the stack mechanism maintains the heater switch open, and whereupon the actuator must release the heater switch after each opening of the motor switch before the motor switch can be again closed.

10. The structure of claim 9 wherein a thermo-actuated current limiter is included in the circuit to the secondary of the relay.

11. The structure of claim 9 wherein a thermo-actuated current limiter responsive to stack temperature is included in the circuit to the secondary of the relay adapted upon an abnormal increase in stack temperature to reduce the secondary current sufficiently to cause the relay to open the relay switch and thereby the circuit to the stoker motor.

IRA E. McCABE.